(12) United States Patent
Tigerfeldt

(10) Patent No.: US 7,607,457 B2
(45) Date of Patent: Oct. 27, 2009

(54) INSULATION SYSTEM FOR TECHNICAL INSTALLATIONS

(75) Inventor: Staffan Tigerfeldt, Helsingborg (SE)

(73) Assignee: Saint-Gobain Isover AB, Courbevoie (FR)

( * ) Notice: Subject to any disclaimer, the term of this patent is extended or adjusted under 35 U.S.C. 154(b) by 534 days.

(21) Appl. No.: 10/575,483

(22) PCT Filed: Oct. 15, 2004

(86) PCT No.: PCT/SE2004/001484

§ 371 (c)(1),
(2), (4) Date: Jun. 12, 2006

(87) PCT Pub. No.: WO2005/038330

PCT Pub. Date: Apr. 28, 2005

(65) Prior Publication Data

US 2007/0017590 A1      Jan. 25, 2007

(30) Foreign Application Priority Data

Oct. 17, 2003   (SE)   .................................... 0302738

(51) Int. Cl.
*F16L 9/14*   (2006.01)
(52) U.S. Cl. .......................... 138/149; 138/157; 138/163
(58) Field of Classification Search .................. 138/149, 138/157, 163
See application file for complete search history.

(56) References Cited

U.S. PATENT DOCUMENTS

| | | | |
|---|---|---|---|
| 3,614,967 A * | 10/1971 | Royston | 138/141 |
| 4,921,018 A * | 5/1990 | Dridi et al. | 138/149 |
| 5,104,701 A * | 4/1992 | Cohen et al. | 428/34.5 |
| 5,441,083 A | 8/1995 | Korsgaard | |
| 5,520,009 A * | 5/1996 | Jepsen et al. | 62/272 |
| 5,690,147 A * | 11/1997 | Cridland et al. | 138/149 |
| 6,460,576 B2 * | 10/2002 | Vitoorapakorn | 138/149 |

FOREIGN PATENT DOCUMENTS

| WO | WO 91/18237 A1 | 11/1991 |
|---|---|---|
| WO | WO 94/05947 A1 | 3/1994 |
| WO | WO 95/19523 A1 | 7/1995 |
| WO | WO 97/16676 A1 | 5/1997 |
| WO | WO 01/53740 A1 | 7/2001 |

* cited by examiner

*Primary Examiner*—James F Hook
(74) *Attorney, Agent, or Firm*—Buchanan Ingersoll & Rooney PC

(57) ABSTRACT

The invention relates to an insulation system for pipes, containers, ventilation ducts and like installation parts which have an outer surface temperature which periodically is below the dew point of the ambient air. The insulation system comprises a thermally insulating layer and a vapour barrier arranged on one side of the thermally insulating layer. The insulation system has a hygroscopic material which is arranged between the vapour barrier and the thermally insulating layer, which hygroscopic material is at least partially connected with the vapour barrier. A combination of the vapour barrier and the hygroscopic material is connected with the thermally insulating layer in such a manner that the hygroscopic material partially makes contact with the thermally insulating layer.

18 Claims, 4 Drawing Sheets

INSULATION SYSTEM FOR TECHNICAL INSTALLATIONS

FIELD OF THE INVENTION

The present invention relates to an insulation system for pipes, containers, ventilation ducts and like installation parts which have an outer surface temperature which periodically is below the dew point of the ambient air. The insulation system comprises a thermally insulating layer and a vapour barrier arranged on one side of the thermally insulating layer.

BACKGROUND ART

In building and process technology it is quite common to insulate, for instance, pipes and containers. The insulation can take place by means of e.g. pipe shells, sheets or mats. A typical insulation consists of a thermally insulating material, such as mineral wool, which on its side facing the ambient air has a protective surface layer of plastic, paper or metal.

Even if a material which is normally considered tight, such as aluminium foil, is selected for the protective surface layer and this is arranged as a continuous enclosure of the thermally insulating material, a completely tight enclosure cannot be obtained. There are always openings, such as joints between neighbouring pipe shells, longitudinal slots to allow mounting of the pipe shells on the pipes or even physical damage, through which openings water vapour can penetrate into the insulation and on to the surface that is to be insulated. Another important source of penetration of the water vapour is diffusion. Diffusion occurs also through materials that are normally considered tight, i.e. also metal or plastic foils, and thus cannot be fully prevented.

When the temperature at the insulated surface is below the dew point of the ambient air, the water vapour is condensed. The problem is that the condensate cannot evaporate, which in the long run causes damage not only to the insulated surface in the form of e.g. corrosion, but also to the actual insulation.

There are established solutions on the market, which function well and provide for removal of the condensate.

A first example is given by WO 91/18237. This solution uses layers of a hygroscopic material on both sides of a thermally insulating material which is adapted to be arranged round, for instance, a pipe. The two layers communicate with each other through an opening in the thermally insulating material, whereby condensate by capillary action can be transported from the inner layer to the outer layer. In the case involving a pipe shell, the inner layer is arranged to surround the pipe and, with its respective free ends, protrude through the slot of the pipe shell to such an extent that these ends can be arranged against the outside of the pipe shell where they are exposed to the ambient air and form an evaporation surface. The hygroscopic material can be resembled to a wick which lets the surface exposed to condensate communicate with the ambient air where the condensate can evaporate freely.

Variants of the same approach are defined in WO 95/19523 where the extent of the hygroscopic material has been reduced. Instead of covering the whole length of the pipe, the hygroscopic material is arranged, for instance, in the form of strips which are equidistantly spaced from each other along the length of the pipe. Like in WO 91/18237, the hygroscopic material extends from a direct contact with the surface in which condensation occurs, i.e. the insulated surface, to the outside of the insulation where it is exposed to the ambient air and forms an evaporation surface.

Another variant is defined in WO 94/05947, which states, inter alia, that the hygroscopic material can be a hygroscopic paint which is applied to the pipe and to selected parts of the pipe shell in such a manner that a continuous paint surface forms, extending from the surface of the pipe to the outside of the pipe shell in order to form an evaporation surface. Thus, the paint has the same function as the hygroscopic material in the above-mentioned WO 91/18237.

WO 97/16676 discloses a solution in which a first gap is formed between the pipe and the surrounding thermally insulating material. The latter is provided with a number of capillary active openings connecting its inside with its outside so that condensate by capillary action can be conducted from the first gap and the surface of the pipe to the outside of the thermally insulating material where the condensate can evaporate to the ambient air. The outside of the thermally insulating material is enclosed by a water-repellent membrane. The membrane is arranged so that a second gap is formed between the thermally insulating material and the membrane. A layer of water-absorbing material is arranged in each gap and it is preferred for the two layers to be connected with each other by, for instance, a slot in the thermally insulating material. Examples of suitable materials of the water-repellent membrane are waterproof and diffusion open textile materials.

A common feature of all prior-art solutions to the problem with removing of condensate thus is that a hygroscopic material is arranged on the surface on which condensate is formed and that this hygroscopic material is brought into direct contact with the ambient air, which takes place by the hygroscopic material forming an evaporation surface which directly or indirectly is exposed to the ambient air. This technique is very well established. However, it is associated with a certain overdimensioning as regards the amount of hygroscopic material. This overdimensioning affects the cost of the product. Moreover, a protective surface is frequently used in the form of, for instance, an adhesive tape which is arranged to partially cover that part of the hygroscopic material which is exposed on the outside of the insulation, whereby this part of the material is prevented from absorbing moisture from the ambient air in an uncontrolled manner.

OBJECTS OF THE PRESENT INVENTION

The object of the present invention is to provide an insulation system which is easy and inexpensive to manufacture.

It should be possible to produce the insulation system in existing production equipment after minor modifications, if any.

The insulation system should be easy to mount without requiring experience from mounting of prior-art systems.

SUMMARY OF THE INVENTION

To achieve the above objects and also other objects that have not been stated above, the present invention concerns an insulation system having features capable of achieving the described advantageous service characteristics through the circumferential presence of at least three specifically defined layers which completely surround the part that is to receive insulation as illustrated.

A number of terms will be used throughout the text, which will be defined as follows. The term vapour barrier relates to a material which makes vapour diffusion and vapour convection difficult. The term hygroscopic material relates to a material that absorbs and transports water vapour and condensate and which emits water vapour due to the moisture of the ambient air in such a manner that equilibrium is achieved.

More specifically, an insulation system is provided for pipes, containers, ventilation ducts and like installation parts which have an outer surface temperature which periodically is below the dew point of the ambient air, said insulation system comprising a thermally insulating layer and a vapour barrier arranged on one side of the thermally insulating layer. The insulation system is characterised by a hygroscopic material arranged between the vapour barrier and the thermally insulating layer, said hygroscopic material being at least partially connected with the vapour barrier, and by the combination of the vapour barrier and the hygroscopic material being connected with the thermally insulating layer in such a manner that the hygroscopic material partially makes contact with the thermally insulating layer.

The term connect concerns throughout the text a partial cohesive or adhesive adhesion between the vapour barrier and/or the hygroscopic material and the thermally insulating layer. In the other intermediate layers, the hygroscopic material is arranged in contact with the layer of thermally insulating material for providing communication between the two materials.

As a result, an insulation system is provided, which in a simple way allows transport of the condensate which in operation can form on the surface that is to be insulated, away from the surface and on to the hygroscopic material arranged between the thermally insulating material and the vapour barrier. By the hygroscopic material partially making contact with the thermally insulating material, absorption of the condensate occurs. The absorbed condensate is allowed to evaporate to the ambient air through the vapour barrier and the inevitable openings therein. The transport of condensate through the thermally insulating material occurs by capillary action. Capillary action is driven by a difference in pore water pressure between the inner water-saturated surface which in the insulation system is a zone with neutral pressure and the ambient air which is a zone with pressure below atmospheric. In other words the condensate penetrates outwards through the thermally insulating material where it is absorbed by the contact with the hygroscopic material. Owing to the absorption, the condensate is spread over a large surface of the hygroscopic material. The condensate collected in the hygroscopic material is allowed to evaporate through the vapour barrier. This results in equilibrium between diffused and evaporated water vapour while using the insulation system.

The insulation system is very simple in terms of construction and can be manufactured and handled as a unit with a limited need for loose components. The amount of hygroscopic material and the type thereof, for instance the choice between a woven continuous surface or a net-like structure, can easily be optimised by the manufacturer depending on the intended operating conditions of the insulation system. The possibility of optimising the hygroscopic material also means that the cost of the insulation system can be reduced.

The insulation system can be manufactured in production equipment that is used for manufacture of insulation systems according to prior-art technique without, or after minor, adjustments of the equipment, whereby the change-over cost in production will be low. Moreover, a fitter with experience from installation of prior-art insulation systems can mount an insulation system according to the present invention without necessitating new training. The insulation system is also applicable in many different shapes, for instance in the form of pipe shells, mats or sheets.

The hygroscopic material can be connected with the thermally insulating layer by means of a thermoplastic binder which is arranged so that, after heating to a temperature above its melting point, it exposes the hygroscopic material to the thermally isolating layer. The exposing ensures partial contact with the thermally insulating material for providing communication between the two materials. The surface of exposure need not be continuous, but it is advantageous that the distribution between areas with and without contact is even over the surface of the insulation.

The hygroscopic material can be thermoplastic. A thermoplastic hygroscopic material enables reduction, or even elimination, of the thermoplastic binder since the hygroscopic material in that case can wholly or partly replace the thermoplastic binder.

The vapour barrier and the hygroscopic material advantageously constitute a laminate. The laminate shape is very advantageous since the amount of binder and the application thereof can be controlled with great accuracy. Moreover, the laminate shape allows exact orientation of the materials and layers included in the insulation system. Last but not least, the laminate shape allows a very simple manufacturing process since the amount of material to be handled has been minimised.

Furthermore the vapour barrier, the hygroscopic material and the thermoplastic binder can constitute a laminate. The including of the thermoplastic binder in the laminate is very much preferred since the amount of binder and the application thereof can thus be controlled with very great accuracy. Precisely the amount of binder and the position thereof are most important to ensure the connection between the vapour barrier and the hygroscopic material.

The thermoplastic binder is preferably arranged in a first layer next to the vapour barrier and in a second layer next to the thermally insulating material. By the binder being arranged in two different layers, the thickness and application pattern of the different layers can be controlled as desired and required. For example, by applying a thick and continuous layer between the vapour barrier and the hygroscopic material, it is possible to ensure complete adhesion between the two materials. Such a layer protects against delamination in case of e.g. outer injurious effects. Simultaneously with this continuous first layer, for instance a non-continuous second layer can be arranged between the hygroscopic material and the thermally insulating material with a view to ensuring the connection, i.e. partial adhesion between the two layers while at the same time forming a binder-free contact surface between the hygroscopic material and the thermally insulating material, in which contact surface the two materials are in contact with each other for mutual communication.

In a preferred embodiment, the laminate comprises perforations which are adapted to make the hygroscopic material communicate with the ambient air. The perforations should be so deep as to penetrate a possible layer of binder between the vapour barrier and the hygroscopic material. The perforations make the hygroscopic material communicate with the ambient air, thereby allowing the condensate that has been absorbed from the insulated surface and the thermally insulating material to evaporate.

The hygroscopic material can advantageously be a non-continuous layer. In other words, the hygroscopic material may also consist of, for instance, a net-like structure, individual threads or bundles of individual threads. The threads can, as will be appreciated by a person skilled in the art, consist of multifilament yarn as well as monofilament yarn. The amount of hygroscopic material can thus be optimised as required, i.e. according to the conditions in which the insulation system is to act.

Also the thermoplastic binder can advantageously be arranged as a non-continuous layer. Such application ensures the connection between the hygroscopic material and the thermally insulating material, i.e. the desired partial adhesion and the partial contact between the hygroscopic material and the thermally insulating material.

In one embodiment, the thermally insulating layer may contain an additional hygroscopic material. The additional hygroscopic material is used for improved absorption and transport of water vapour and condensate from the pipe, the container, the ventilation duct or the installation part. Such an additional hygroscopic material may consist of, for instance, a layer which is integrated in the thermally insulated layer in the form of a pleated mat or laminated mat as is well known to a person skilled in the art. It may also consist of a layer which is arranged between two successive segments in a segmented flexible pipe shell, i.e. a pipe shell which along its length is divided into a plurality of flexible segments in order to facilitate flexing of the pipe shell round, for instance, a pipe bend. The latter layer may consist of, for instance, a cloth or textile of hygroscopic material or consist of a surface coated with hygroscopic paint. The textile may contain, for instance, a compressed fibre structure.

In another embodiment, the hygroscopic material may form a reinforcement of the vapour barrier. The reinforcement increases the tear strength in the vapour barrier and, thus, the risk of external damage.

The laminate can advantageously be given such a width as to form flaps which can be made to enclose pipes, containers, ventilation ducts and like installation parts. Such flaps can be provided with an adhesive tape for adhesion to the outside of the vapour barrier and, thus, sealing of the slot which is often to be found in pipe insulations in order to facilitate insulation thereof.

The vapour barrier can advantageously have moisture adaptive properties.

According to another aspect of the invention, it relates to use of such an insulation system.

DESCRIPTION OF DRAWINGS

The invention will now be described in more detail by way of example and with reference to the accompanying drawings, which illustrate a currently preferred embodiment.

FIG. 2b is an enlarged view of part of the pipe insulation according to claim 2a.

FIG. 5b is a perspective view which schematically illustrates the production of individual segments of the pipe shell illustrated in FIG. 5a.

TECHNICAL DESCRIPTION

The insulation system according to the invention is intended to be used for pipes, containers, ventilation ducts and like installation parts which periodically has an outer temperature which is below the dew point of the ambient air. In the following description, the generic term element will be used for these pipes, containers, ventilation ducts or installation parts.

Figure 1:
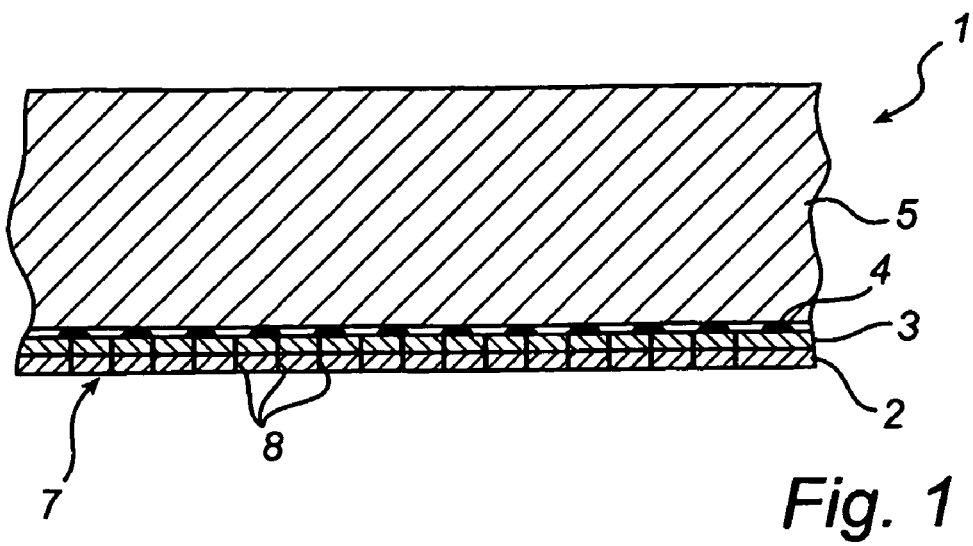
FIG. 1 is a schematic cross-section of the material layers that are included in an insulation system according to the invention.

With reference to FIG. 1, a schematic cross-section of an insulation system 1 according to the invention is shown. It should be emphasised that all the material layers in FIG. 1 and the other Figures which are included in the insulation system 1 are, for the sake of clarity, shown with highly exaggerated proportions.

The insulation system 1 comprises, starting from the outside, a vapour barrier 2, a hygroscopic material 3, a thermoplastic binder 4 and a thermally insulating material 5. It will be appreciated that the thermoplastic binder 4 can, of course, be arranged as one or more layers or in a position other than the illustrated. The thermally insulating material 5 is adapted to directly or indirectly engage the surface of the element (not shown) which is to be insulated. The four layers 2, 3, 4, 5 will be described individually below, after which various embodiments of such insulation systems 1 will be given. The description of the individual layers is, if not otherwise stated, given in a state before being affected by heat, i.e. before the thermoplastic binder has melted.

The primary function of the vapour barrier 2 is to make vapour diffusion or vapour convection difficult. As mentioned above, it is generally known that it is not possible to obtain a completely tight encapsulation of an insulated element. There will always be joints through which water or water vapour can penetrate and, once inside the insulation, condense on a cooler surface, i.e. on the element. In most cases there will also during the life of the insulation system 1 arise damage to the vapour barrier 2, which allows water or water vapour to penetrate. A third factor that cannot be avoided is diffusion which occurs through surfaces which are normally considered tight, i.e. also through metal foil or plastic foil.

The selection of material of the vapour barrier 2 is a question of, inter alia, the environment in which the insulation system 1 is to act, current specified building standards, current fire control standards and, above all, costs. Examples of suitable materials are metal foil, plastic foil, paper and water-repellent membrane materials. Water-repellent membrane materials relate to materials which in a first thickness direction allow transport of water vapour and which in a second thickness direction prevent transport of water. Examples of water-repellent membrane materials are the materials that are sold under the name GoreTex®.

The vapour barrier 2 can also be made of a material having moisture adaptive properties. With moisture adaptive properties is meant a material whose resistance to diffusion of water vapour depends on the air humidity in the surrounding atmosphere. One example of such material is given in EP 0 821 755 B1. Materials adapted for the purpose of the invention are such that, when the relative humidity in the atmosphere surrounding a vapour barrier of this kind is within the range 30-50%, the Sd value (water-vapour diffusion resistance) is within the range 2 to 5 meters diffusion-equivalent air-layer thickness. Correspondingly, when the relative air-humidity is within the range 70-80%, which may be extended to 60-80%, or 70-90%, the Sd value is less than 1 meter diffusion-equivalent air-layer thickness. A vapour barrier of this kind is preferably made of nylon-6, nylon-4 or nylon-3. Further, a vapour barrier of this kind is preferably used in a thickness from 10 μm to 2 mm and most preferred from 20 μm to 100 μm.

By a hygroscopic material 3 is meant, as mentioned above, a material capable of absorbing and transporting water vapour and condensate and emitting water vapour due to the moisture of the ambient air in such a manner that equilibrium is achieved. The hygroscopic material 3 may consist of a number of different materials, such as glass fibre, wood, cardboard, activated clay, aluminium silicate or silica gel. The hygroscopic material 3 may also consist of a thermoplastic material such as polyester or nylon. The latter type of material means that the amount of thermoplastic binder can be reduced or excluded completely.

In the case where the hygroscopic material 3 consists of glass fibre or a thermoplastic material, it is preferred if the hygroscopic material has the form of a woven, spun, pleated or knitted structure. The hygroscopic material 3 may also consist of staple fibre or a felt-like textile structure.

In its simplest embodiment, the hygroscopic material 3 consists, as shown, of a continuous layer, but may also consist of a non-continuous layer in the form of e.g. a fine- or coarse-meshed net or in the form of individual threads or even threads arranged in bundles. The threads may consist of monofilament yarn or multifilament yarn.

The hygroscopic material 3 can also be used in one or more layers. When using a plurality of layers, the layers can be given different mutual orientations. For example, two layers with net structure can be mutually oriented at an angle of 45°.

It will also be appreciated that the hygroscopic material 3 may consist of a hygroscopic paint.

The thermoplastic binder 4, below referred to as binder, may consist of a number of different substances, polyethylene (PE) being the most preferred one. The binder 4 may consist of one or more continuous layers, and/or consist of one or more non-continuous layers. FIG. 1 shows a non-continuous layer most schematically before being affected by pressure and heat.

The binder 4 is arranged so that, when heated to a temperature above its melting temperature, it melts and connects the hygroscopic material 3 with the thermally insulating material 5. The term connect relates to a partial cohesive or adhesive adhesion between the vapour barrier and/or the hygroscopic material 3 and the thermally insulating material 5. In the other intermediate areas, the hygroscopic material 3 is arranged in contact with the thermally insulating material 5 for providing communication between the two materials. The distribution between the areas with and without adhesion should be even over the surface of the insulation system 1. The provision of the connection will be described below.

In connection with heating, a uniformly distributed pressure is applied, for instance by rolls, whereby adhesion occurs by a combination of the binder 4 being pressed into the thermally insulating material 5, which in most cases has an open fibre structure or alternatively open pores, and being pressed into spaces and irregularities in the hygroscopic material 3. Examples of such spaces are irregularities in its surface, pores, perforations, spaces between neighbouring threads in a woven, spun, pleated or knitted structure, spaces between neighbouring threads in a net-like structure or spaces between individual fibres in a batt of staple fibre or in a textile.

By the binder 4 being pressed into the open fibre structure/pores and into the above-mentioned spaces, adhesion to the thermally insulating material 5 occurs above all in these areas while at the same time a binder-free contact surface between the hygroscopic material 3 and the thermally insulating material 5 forms, in which contact surface the two materials are in contact with each other for mutual communication.

The above-mentioned connection thus consists of partial adhesion, the extent of which depends on the surface structure and the form of the hygroscopic material 3, i.e. if it consists of, for instance, a woven continuous layer or a net-like structure.

It will be appreciated that the adhesion occurs not only to the thermally insulating material 5, but also to the vapour barrier 2 which is arranged on the opposite side of the hygroscopic material 3. The adhesion between the vapour barrier 2 and the hygroscopic material 3 can advantageously be continuous. This is regulated, for instance, by a separate layer of binder 4 between the vapour barrier 2 and the hygroscopic material 3, which will be discussed below.

The binder 4 can be applied in various ways, some of which will be described below.

The binder 4 can be applied as a thin continuous layer on top of the hygroscopic material 3 on the surface oriented towards the thermally insulating material 5. Such a layer should be so thin that, during heating to a temperature above its melting temperature in combination with an applied pressure, it is pressed away and partially brings the hygroscopic material 3 in contact with the thermally insulating material 5. In accordance with the description above, the excess of binder 4 is pressed into the thermally insulating material 5 or into spaces in the hygroscopic material 3 where it causes partial adhesion between the hygroscopic material 3 and the thermally insulating material 5, and adhesion between the vapour barrier 2 and the thermally insulating material 5.

The pressure is suitably applied by means of rolls. A suitable amount of binder is 5-100 $g/m^2$, more preferred 10-70 $g/m^2$ and most preferred 20-50 $g/m^2$.

A conceivable variant of that stated above is that a binder layer is arranged between the vapour barrier 2 and the hygroscopic material 3. When applying heat and pressure, the molten binder 4 is pressed upwards through spaces in the hygroscopic material 3, for instance between threads in a woven structure, whereby the binder 4 comes into contact with the thermally insulating material 5. The function will be same as if the binder, as described above, would be applied as a layer on top of the hygroscopic material 3, i.e. on the side facing the thermally insulating material 5.

The binder 4 can also be arranged in two layers, a first layer being arranged between the vapour barrier 2 and the hygroscopic material 3 and a second layer between the hygroscopic material 3 and the thermally insulating material 5. The first layer, which preferably is given a thickness which is the same as or smaller than the thickness of the hygroscopic material 3, ensures continuous adhesion between the vapour barrier 2 and the hygroscopic material 3. However, the first layer is not allowed to be so thick that the hygroscopic material 3 is fully embedded in the layer. The second layer is applied very thinly between the hygroscopic material 3 and the thermally insulating layer 5. This second layer is arranged so thinly that a pressure applied from outside under heat exposure at a temperature below the melting point of the first layer is capable of pressing aside the second layer of binder 4 so that the hygroscopic material 3 comes into partial contact and partial adhesion with the thermally insulating material 5 according to the description above.

A fourth variant of application of binder 4 is in the form of a non-continuous layer which is applied very thinly, for example by pressing or spraying. This type of application ensures the desired partial adhesion and the partial contact between the hygroscopic material 3 and the thermally insulating layer 5. A non-continuous layer of binder 4 should be used in the cases where the hygroscopic material 3 is a hygroscopic paint.

A surprising effect has been demonstrated by the arrangement of the hygroscopic material in a binder. There occurs, in fact, pore formation in the binder in connection with the hygroscopic material, which has been found to greatly improve the capillary suction.

The thermally insulating material 5 is suitably a conventional thermally insulating material, such as mineral wool or some other diffusion open material. The term mineral wool comprises glass wool and rock wool.

The vapour barrier 2, the hygroscopic material 3 and the binder 4 can be arranged as separate layers but should, for manufacturing reasons, be arranged, as shown, in the form of a laminate 7 which during production of the insulation system 1 is laminated on the thermally insulating material 5 by exposure to heat and pressure so as to achieve the desired adhesion. A laminate 7 is very easy to apply to the thermally insulating layer 5 during production of the insulation system 1 since it can be handled in one piece. The laminate 7 ensures an exact amount and distribution of the binder 4, thus ensuring that the hygroscopic material 3 achieves partial contact with and partial adhesion to the thermally insulating material 5. At the same time the laminate ensures, where possible, a desired adhesion between the vapour barrier 2 and the thermally insulating material 5. The laminate 7 also ensures, if this is the case, a desired orientation of the hygroscopic material 3 relative to the thermally insulating material 5. An example of the latter is orientation of threads of a hygroscopic material perpendicular to or parallel with a longitudinal axis of a pipe insulation 6.

In production of the insulation system 1, the laminate 7, or the individual material layers, is applied under pressure and heat to the thermally insulating material 5. By heat is here meant a temperature exceeding the melting point of at least one layer of binder 4, and preferably the layer which is arranged between the hygroscopic material 3 and the thermally insulating material 5. In this process, the laminate 7, or the individual material layers 2, 3, 4, will together with the thermally insulating material 5 form a single unit in the form of an insulation system 1. This insulation system 1 can have the form of e.g. a pipe shell, mat or sheet.

The vapour barrier 2 preferably comprises perforations 8 which are made mechanically. The perforations 8 are arranged through the vapour barrier 2 and an optional laminate 7 comprising the vapour barrier 2 in such a manner that they make the hygroscopic material 3 communicate with the ambient air, whereby the condensate that has been absorbed from the element and the thermally insulating material 5 can evaporate. The perforations 8 should thus have such a depth as to penetrate the vapour barrier 2 and an optional binder layer 4 between the vapour barrier 2 and the hygroscopic material 3.

The perforations 8 are preferably arranged with a frequency of 30-100,000 perforations/$m^2$, more preferred 200-50,000 perforations/$m^2$ and most preferred 1,000 perforations/$m^2$. The perforations 8 can be arranged in a regular or irregular pattern.

By the perforations 8 being arranged over the surface of the vapour barrier 2, perforations 8 will, independently of the design of the hygroscopic material 3, directly coincide with the hygroscopic material 3 and thus form an opening for communication with the ambient air for evaporation. Perforations 8 that do not coincide with the hygroscopic material 3 form small openings towards the thermally insulating material 5, through which openings water can penetrate. However, this water can evaporate through the same opening or alternatively be conducted by capillary action to the hygroscopic material 3 for further evaporation in the next perforation 8.

Depending on the thickness of the vapour barrier 2, purposely arranged perforations 8 are, however, not always necessary. In the cases where the vapour barrier 2 is a metal or plastic foil, it contains, owing to its manufacturing process, a varying degree of pinholes, i.e. defects in the material that appear as small microperforations which facilitate diffusion. The thinner the foil, the more pinholes. The lower value 200 in the range 200-50,000 perforations/$m^2$ corresponds to the number of pinholes that arise in normal manufacture of an aluminium foil with a thickness of 7 μm. Pinholes have been found to give the surprising effect that they allow sufficient evaporation of condensate from the hygroscopic material 3. Defects in the form of pinholes can thus in this respect be equated with perforations.

The function of the inventive insulation system 1 will be described in the following.

In accordance with the description above, water from the ambient air penetrates into the insulation system 1 through inevitable openings in the vapour barrier 2. Furthermore water vapour penetrates by diffusion. In case of a temperature difference in the insulation system 1 and the element relative to the ambient air, condensation occurs. The condensation occurs on the coolest surface which usually is the surface of the element. By capillary action driven by a difference in pore water pressure, the condensate strives towards an area with pressure below atmospheric, which area is to be found in or in connection with the hygroscopic material. In other words, the condensate migrates outwards through the thermally insulating material 5 where it is absorbed by the contact with the hygroscopic material 3. The absorption results in the condensate spreading in the hygroscopic material 3. The spreading is accelerated by the difference in the partial pressure, whereby the condensate strives towards the perforations 8 or pinholes formed in the vapour barrier 2, where it comes into contact with the ambient air and can evaporate. Equilibrium between the amount of diffused and evaporated water vapour will be achieved in the insulation system 1 when in use.

The insulation system 1 according to the invention has been found to cause increased circulation of moisture. Owing to possible perforations 8, the diffusion can in fact be somewhat greater than in traditional insulation systems 1, which means that a greater amount of condensate must be transported away by evaporation. The evaporation requires a great deal of energy, which becomes apparent in measuring in the form of inferior insulating capacity, i.e. a higher λ value (thermal conductivity) than in traditional insulation systems. This can, as will be appreciated by a person skilled in the art, be compensated for by arranging a thicker layer of thermally insulating material 5.

Figure 2A:
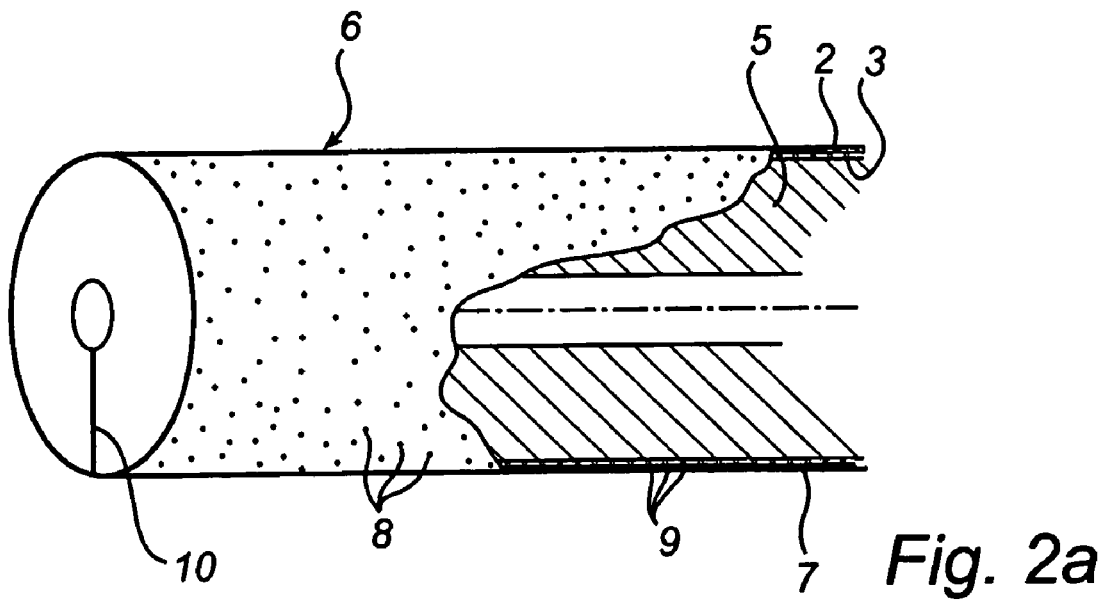
FIG. 2a is a perspective view partly in cross-section of a pipe insulation according to a first embodiment of the invention.

FIG. 2*a* shows an embodiment of the invention applied to a pipe insulation 6. The pipe insulation 6 comprises a laminate 7 of an aluminium foil, a net-shaped hygroscopic material 3 and a binder layer of PE (not shown). The amount of binder is 20-50 g/$m^2$ and is arranged in a thin continuous layer which initially binds the hygroscopic material 3 to the vapour barrier 2 for forming of the laminate 7. The laminate 7 is perforated by means of a roller. When manufacturing the pipe insulation 6, the laminate 7 is applied, under high mechanical pressure and at a temperature exceeding the melting point of the binder, to the thermally insulating material 5. During this pressure and heat treatment, the binder is pressed away from the side of the hygroscopic material 3 which faces the thermally insulating material 5 and out in the free space between the threads 9 of the net-like structure of the hygroscopic material 3. This means that the hygroscopic material 3 partially comes into contact with the thermally insulating material 5. Moreover, partial adhesion occurs between the hygroscopic material 3, or rather in the spaces therein, and the thermally insulating material 5.

During this application of pressure and heat, the initial adhesion between the vapour barrier 2 and the hygroscopic material 3 is not detrimentally affected. This adhesion is preferably continuous over the entire contact surface therebetween.

The pipe insulation 6 comprises in conventional manner a longitudinal through slot 10 (not shown) which facilitates mounting of the pipe insulation 6. When mounting the pipe insulation 6, the slot 10 is preferably sealed with an adhesive tape (not shown) which can be provided with perforations 8.

Figure 2B:
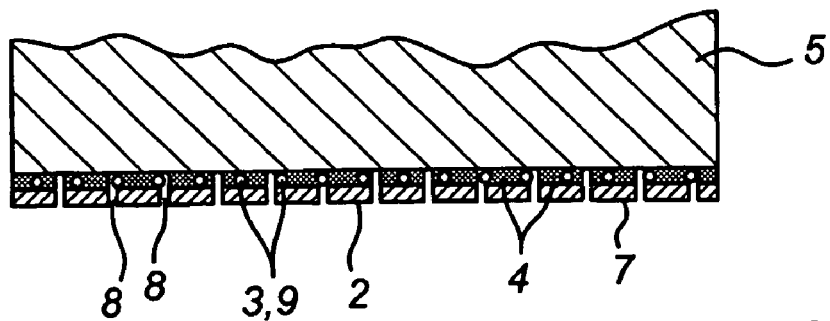

FIG. 2b shows an enlarged part of the pipe insulation 6 shown in FIG. 2a. This view of an enlarged part shows the pipe insulation 6 after being thermally affected, whereby the binder 4 has penetrated into the space between the threads 9 in the hygroscopic material 3, which is formed as a net-like structure. The Figure shows clearly how partial adhesion is arranged between the hygroscopic material 3 and the thermally insulating material 5, and between the vapour barrier 2 and the hygroscopic material 3. For the purpose of illustration, perforations 8 are also shown, which are arranged to make the thermally insulating material 5 and the hygroscopic material 3 communicate with the ambient air. It is clearly shown how some perforations make the hygroscopic material communicate with the ambient air while other perforations make the thermally insulating material communicate with the ambient air.

Figure 3:
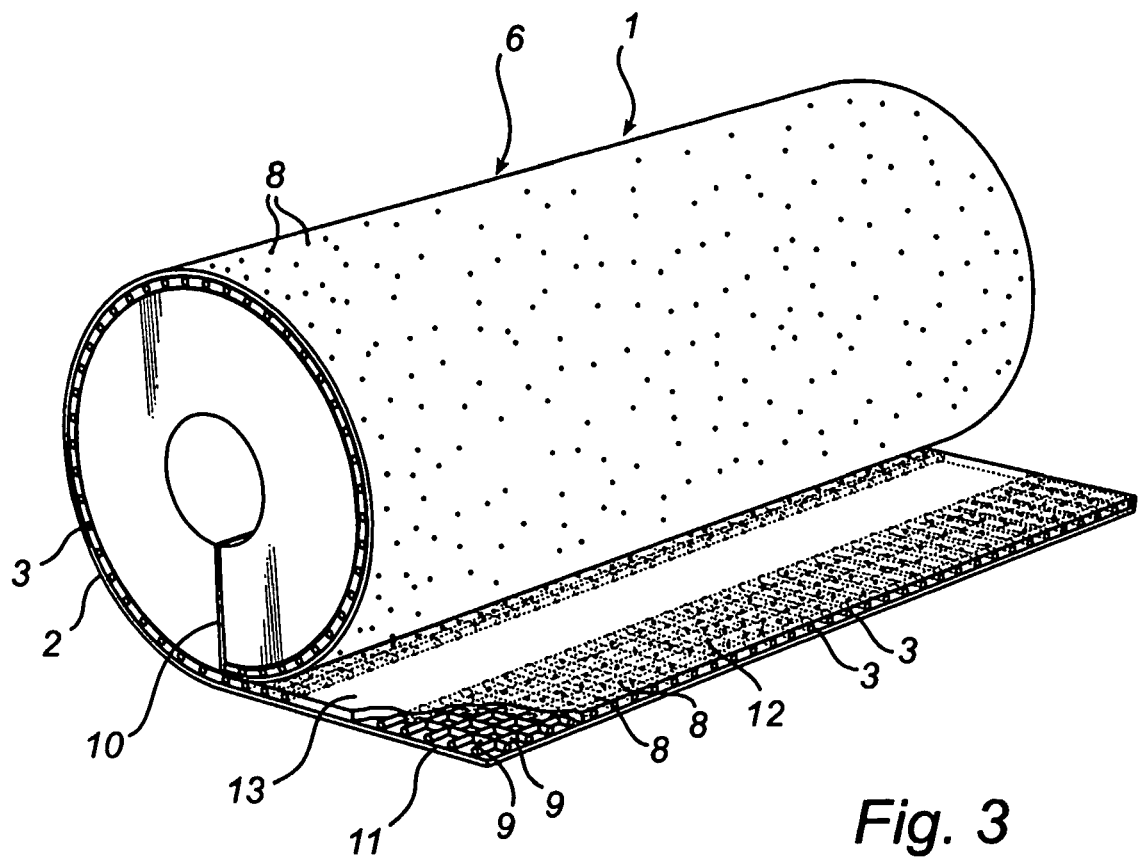
FIG. 3 is a perspective view of a pipe insulation according to a second embodiment of the invention, in which the hygroscopic material is exposed to the ambient air via a flap made from the laminate.

FIG. 3 shows another embodiment of a pipe insulation 6 in accordance with the insulation system 1 according to the invention. The pipe insulation 6 has the same internal construction as the one in FIG. 2a, and therefore its construction will not be described once more and the same reference numerals will be used for equivalent parts. The pipe insulation 6 differs from the one shown in FIG. 2 by the laminate 7 having such a width as to circumferentially enclose the pipe insulation 6 by more than 360°, i.e. the laminate 7 forms a protruding flap 11. The flap 11 has such a width as to form a surface 12 which is freely exposed to the ambient air. The flap 11 has on its surface next to the slot 10 an adhesive tape 13 with a protective film for sealing the slot 10 after mounting of the pipe insulation 6. Outside this surface of the flap 11, the hygroscopic material 3 is freely exposed to the ambient air, whereby this exposed surface 12 forms an extra evaporation surface for the condensate that has been absorbed by the hygroscopic material 2 inside the insulation system 1. Thus the condensate can evaporate on the one hand through the vapour barrier 2 and, on the other hand, through this freely exposed surface 12 of the flap 11.

When mounting such a pipe insulation 6, the pipe shell is preferably mounted so that the flap 11 is oriented so as not to form an upwardly directed compartment in which water and dirt can be collected.

The technique involving a flap in accordance with the example above can also be used for an overlap (not shown) between two successive pipe insulations. A flap having a corresponding construction of vapour barrier, hygroscopic material and binder is arranged as a protruding surface at the end of the first pipe insulation. When two pipe insulations are mounted side by side, the protruding surface of the first pipe shell is arranged to overlap the vapour barrier of the second pipe insulation, thereby forming a more or less freely exposed evaporation surface. In such a solution, the hygroscopic material may be, for instance, individual threads or bundles of threads which are oriented parallel with the longitudinal axis of the pipe insulation.

Figure 4:
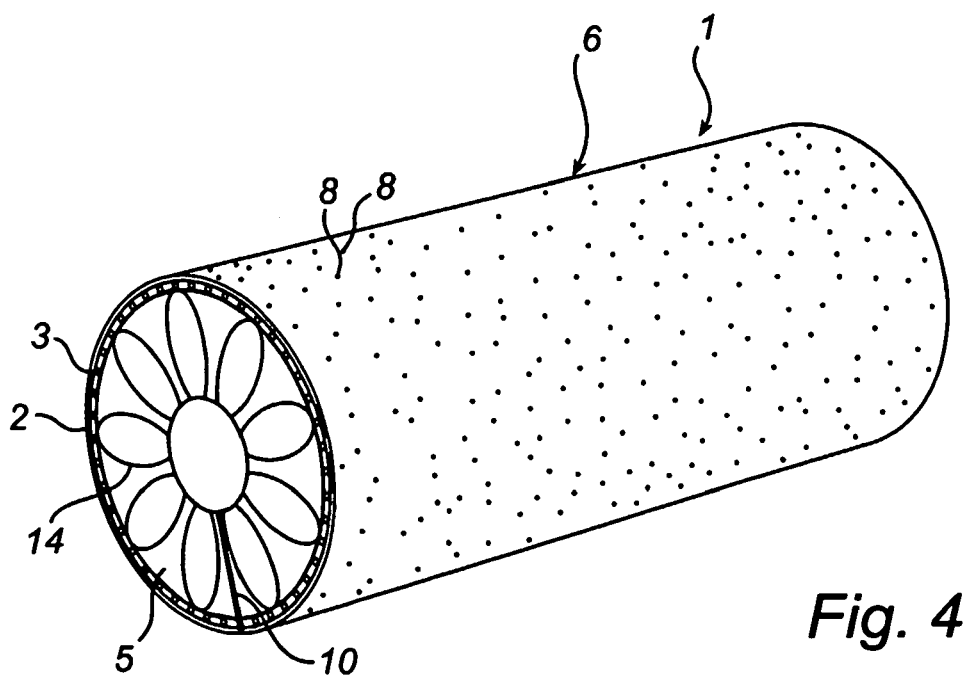
FIG. 4 is a perspective view of a pipe insulation according to the invention, in which the thermally insulating material comprises an additional hygroscopic material.

FIG. 4 shows one more variant of a pipe insulation 6. The pipe insulation 6 has essentially the same internal construction as the one in FIG. 2a, and therefore its construction will not be described once more and the same reference numerals will be used for equivalent parts. The insulation system 1 differs from the already shown system by the thermally insulating material 5. The thermally insulating material 5 comprises an additional hygroscopic material 14 which in cross-section forms a wave-shaped pattern in the thermally insulating material 5. Such a thermally insulating material 5 can be manufactured in the same way as a pleated mat as is well known to a person skilled in the art. The method of manufacturing pleated mats is described, for instance, with reference to EP 434 536 B1, where a mineral wool mat with an applied hygroscopic material is compressed in the horizontal direction before curing, thus resulting in a wave-shaped pattern. A thus designed insulation system 1 exhibits greater absorption capacity owing to its larger absorption surface.

Figure 5A:
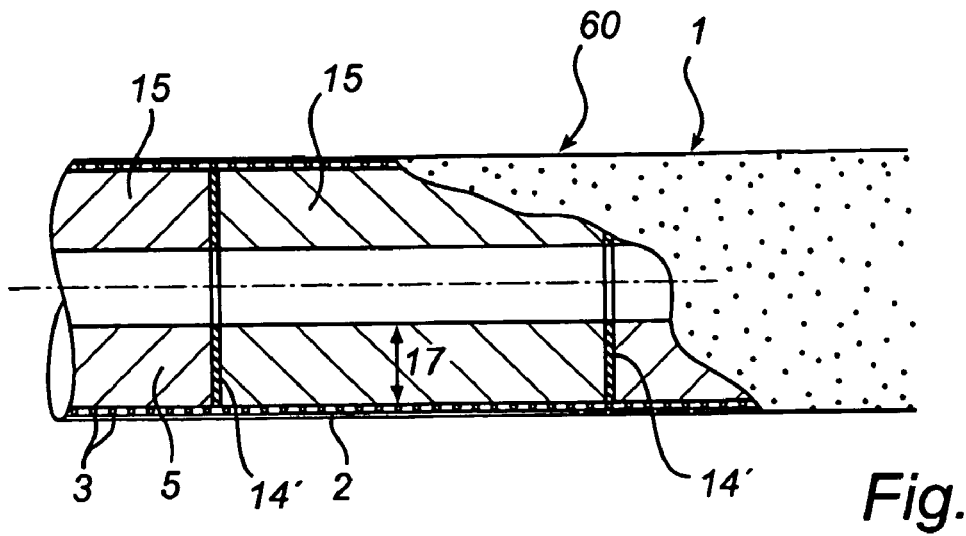
FIG. 5a is a part-sectional side view of an insulation system according to the invention in the form of a flexible pipe shell.

FIG. 5a illustrates a flexible pipe shell 60 with an insulation system 1 according to the invention. The pipe shell 60 is structured in the same way as the pipe insulation 6 as shown and described with reference to FIG. 2a, and therefore the description of its construction will not be repeated and the same reference numerals will be used. The insulation system 1 differs by the thermally insulating material 5 along the length of the pipe shell 60 being divided into a number of short flexible segments 15, which allows the pipe shell 60 to be easily bent round pipe bends. Between each segment 15, an additional hygroscopic material 14' is arranged, which forms an absorption surface perpendicular to the longitudinal direction of the pipe shell 60. The hygroscopic material 14' can, as illustrated, consist of a continuous surface, but can with the same success consist of a net-shaped structure, such as a net, or even a paint. The additional hygroscopic material 14' may also consist of a piece of laminate 7 of the type that has been described above. In that respect, the laminate can be arranged on only one surface between two successive segments 15, or alternatively on both surfaces between two successive segments.

A pipe shell 60 of this construction can advantageously be provided with extra perforations 8 locally in connection with the areas with the additional hygroscopic material 14'.

Figure 5B:
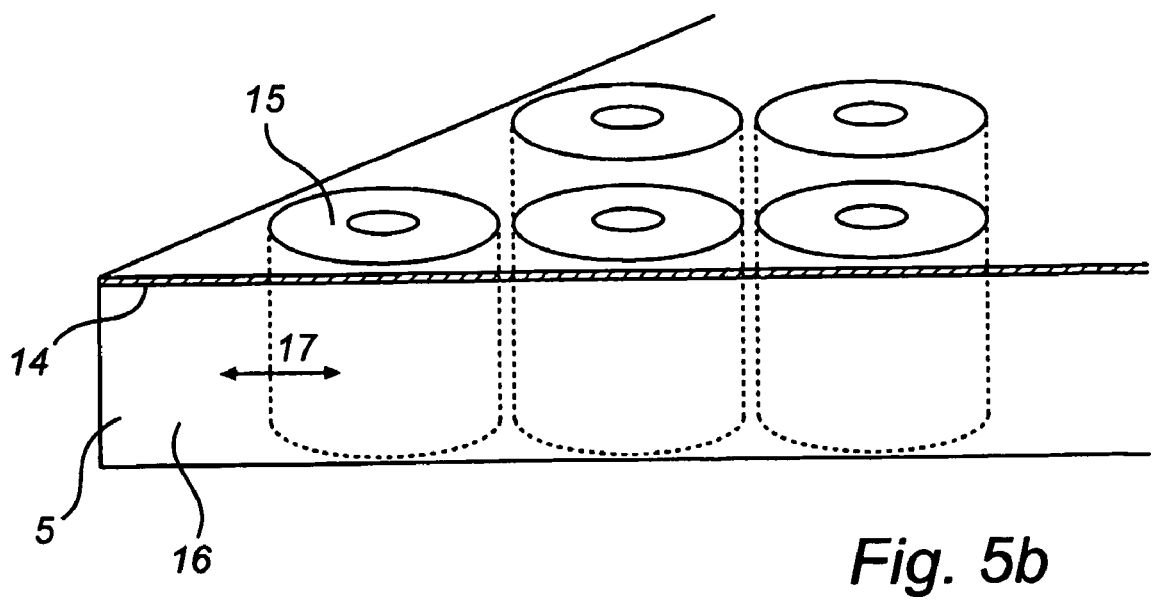

With reference to FIG. 5b, the individual segments 15 are preferably made by the hygroscopic material 14' being arranged with a binder (not shown) on a mat 16 of thermally insulating material 5. The hygroscopic material 14' can also be made to adhere without a binder, by adhering to the thermally insulating material 5 during the curing process to which it may be later subjected during its manufacture. The mat 16 has a thickness corresponding to the length of the segments 15. After that individual segments 15 are punched/cut/sawn from the mat 16 and arranged on, for instance, a laminate (not shown) containing a vapour barrier, a hygroscopic material of some kind and a thermoplastic binder. This manufacturing process is very advantageous since the mat 16 by its structure from its manufacture has a fibre direction 17 which lies essentially in the plane of the mat 16. By the individual segments 15 being punched/cut/sawn and oriented in the pipe shell 60 with their longitudinal axis in the longitudinal axis of the pipe shell 60, the fibre direction in each segment will be perpendicular to the longitudinal axis of the pipe shell 60. This has a positive effect on the transport of condensate by capillary action in the insulation system 1.

Figure 6A:
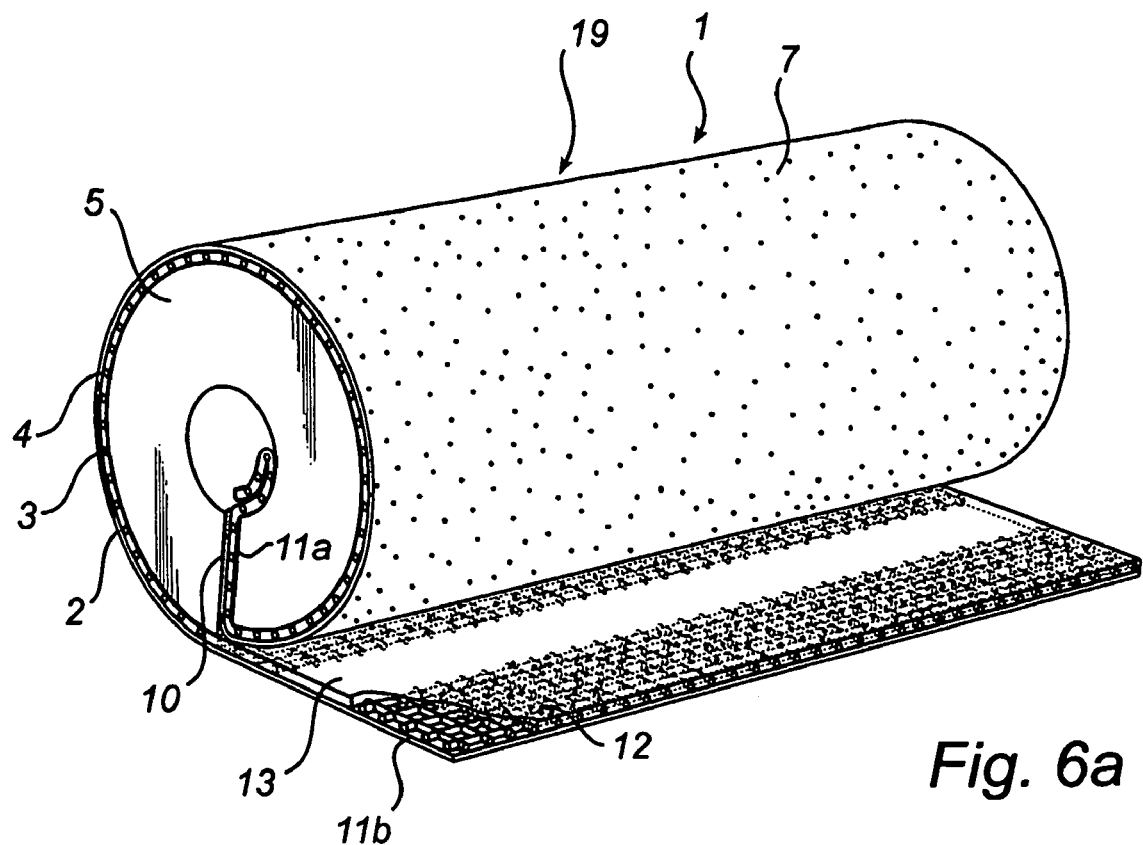
FIGS. 6a and 6b are perspective views of two variants of pipe insulations where the laminate is arranged as one or more overlapping flaps.

FIG. 6a shows another embodiment of an insulation 19 in accordance with the insulation system 1 according to the invention. The insulation 19 has the same internal construction as the pipe insulation 6 shown in FIG. 2a and therefore its construction will not be described once more and the same reference numerals will be used for equivalent parts. The laminate 7 here has such an extent in the circumferential direction as to form a first and a second protruding flap 11a, 11b on the respective sides of the slot 10 formed in the pipe insulation. When mounting the insulation 19 on, for instance, a pipe (not shown) the first flap 11a is arranged to extend inwards through the slot 10 so as to preferably come into contact with the pipe. The first flap 11a should have a width exceeding the depth of the slot 10, i.e. a width exceeding the thickness of the thermally insulating material 5. The first flap 11a can, depending on its width, be laid flat, or as illustrated, be folded in two in the slot 10. If the flap 11a is laid flat, it is preferably arranged in such a manner in the slot 10 that the side of the laminate 7 which comprises the hygroscopic material 3 is directed towards the pipe. The second flap 11b has, like the pipe insulation 6 illustrated in FIG. 3, advantageously such a width as to form a surface 12 which is freely exposed to the ambient air. The second flap 11b can on its surface next to the slot 10 comprise an adhesive tape 13 with a protective film for sealing the slot 10 after mounting of the insulation 19. Outside this surface of the second flap 11b, the hygroscopic material 3 is freely exposed to the ambient air, whereby this exposed surface 12 forms an extra evaporation surface for the condensate that has been absorbed by the hygroscopic material 3 inside the insulation system 1. The condensate can thus evaporate on the one hand through the vapour barrier 2 and, on the other hand, through this freely exposed surface 12 of the second flap 11b.

Figure 6B:
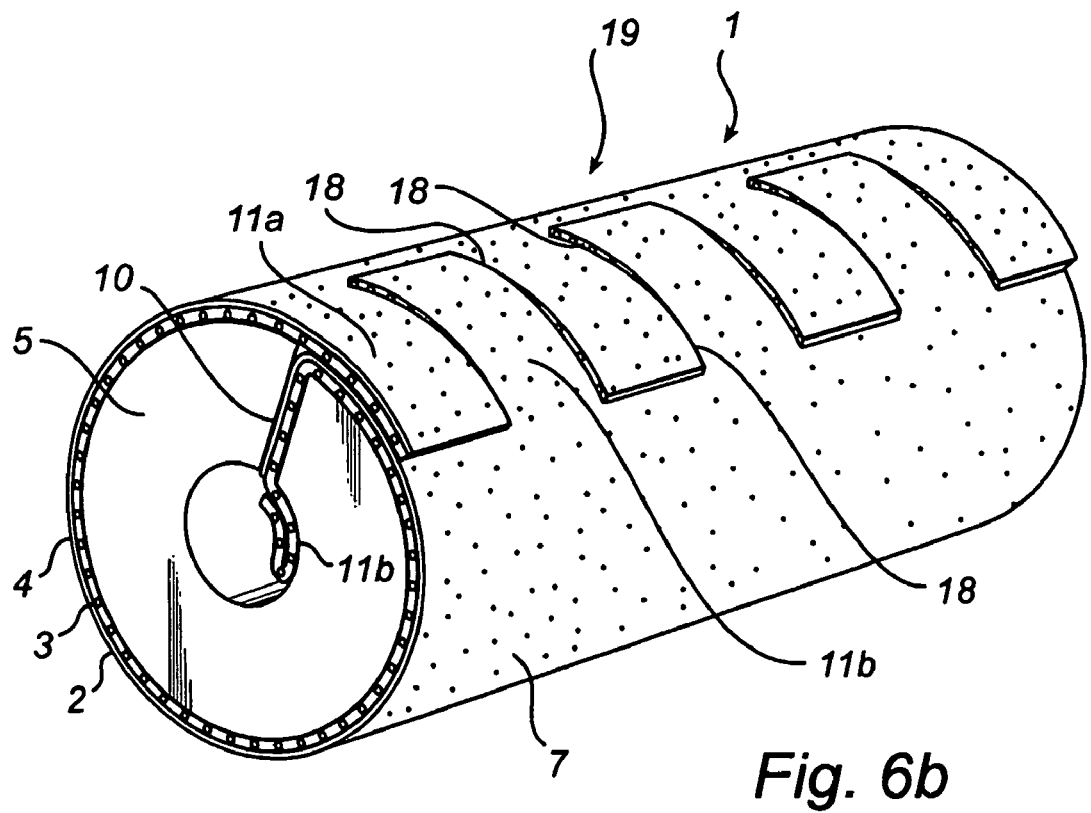

FIG. 6b shows one more variant of the embodiment illustrated in FIG. 6a. The first flap 11a and the second flap 11b, respectively, preferably have the same width and can be provided with, or be without, an adhesive tape. In FIG. 6b, the flaps 11a, 11b are shown without an adhesive tape. The flaps 11a, 11b are sectioned with slots 18 which extend in the circumferential direction. When mounting such an insulation 19, the first flap 11a and the second flap 11b are alternately arranged to extend inwards through the slot 10, and advantageously in such a manner as to make contact with the pipe. The flaps 11a, 11b can be laid flat or folded in two in the slot 10. Moreover, they are preferably arranged in the slot 10 in such a manner that the side of the laminate 7 which comprises hygroscopic material 3 is directed outwards, i.e. towards the pipe.

The embodiments illustrated in FIGS. 6a and 6b are of particular interest in rigid pipe shells or other insulation systems 1 which do not have an additional hygroscopic material 3 integrated into the thermally insulating layer 5.

It will be appreciated by a person skilled in the art that the above embodiments of the insulation system 1 can be arranged with the same success in the form of mats or sheets.

It will also be appreciated by a person skilled in the art that the insulation systems 1 according to the invention can be used in combination with loose components of hygroscopic material. For example, it may be advantageous to apply a hygroscopic material 3 directly in connection with the element which is to be insulated. Such an additional hygroscopic material is advantageously applied at regular intervals on non-horizontal elements for absorption of condensates flowing along the element.

It will be appreciated that the present invention is not restricted to the embodiments of the inventive insulation system 1 which have been shown and described. Several modifications and variants are thus feasible, and consequently the invention is defined exclusively by the appended claims.

The invention claimed is:

1. An insulation system (1) for pipes, containers, ventilation ducts and like installation parts which have an outer surface temperature which periodically is below the dew point of the ambient air, said insulation system comprising a thermally insulating layer and (5), a layer of a vapour barrier (2) arranged on one side of the thermally insulating layer, and a layer of hygroscopic material (3), said layers being circumferentially arranged in such a manner that the insulation system (1), starting from the outside, comprises said vapour barrier (2), said layer of hygroscopic material (3), and said thermally insulating layer (5), the layer of hygroscopic material (3) being arranged between the layer of the vapour barrier (2) and the thermally insulating layer (5), said hygroscopic material (3) being at least partially connected with the vapour barrier (2), and the combination of the vapour barrier (2) and the hygroscopic material (3) being connected with the thermally insulating layer (5) in such a manner that the hygroscopic material (3) partially makes contact with the thermally insulating layer (5), and with said layer of hygroscopic material (3) being arranged so as not to make contact with the outer surface of the installation part that receives said insulation system.

2. An insulation system as claimed in claim 1, in which the hygroscopic material (3) is connected with the thermally insulating layer (5) by means of a thermoplastic binder (4) which is arranged so that, after heating to a temperature above its melting point, it exposes the hygroscopic material (3) to the thermally insulating layer (5).

3. An insulation system as claimed in claim 2, in which the vapour barrier (2), the hygroscopic material (3) and the thermoplastic binder (4) constitute a laminate (7).

4. An insulation system as claimed in claim 3, in which the thermoplastic binder (4) is arranged in a first layer next to the vapour barrier (2) and in a second layer next to the thermally insulating layer (5).

5. An insulation system as claimed in claim 3, in which the laminate (7) comprises perforations (8) which are adapted to make the hygroscopic material (3) communicate with the ambient air.

6. An insulation system as claimed in claim 3, in which the laminate (4) has such a width as to form flaps (11; 11a; 11b) which can be made to enclose pipes, containers, ventilation ducts and like installation parts.

7. An insulation system as claimed in claim 3, in which the vapour barrier (2) has moisture adaptive properties.

8. An insulation system as claimed in claim 2, in which the thermoplastic binder (4) is arranged as a non-continuous layer.

9. An insulation system as claimed in claim 1, in which the hygroscopic material (3) is thermoplastic.

10. An insulation system as claimed in claim 1, in which the vapour barrier (2) and the hygroscopic material (3) constitute a laminate (7).

11. An insulation system as claimed in claim 10, in which the laminate (7) comprises perforations (8) which are adapted to make the hygroscopic material (3) communicate with the ambient air.

12. An insulation system as claimed in claim 10, in which the laminate (4) has such a width as to form flaps (11; 11a; 11b) which can be made to enclose pipes, containers, ventilation ducts and like installation parts.

13. An insulation system as claimed in claim 10, in which the vapour barrier (2) has moisture adaptive properties.

14. An insulation system as claimed in claim 1, in which the hygroscopic material (5) is a non-continuous layer.

15. An insulation system as claimed in claim 1, in which the thermally insulating layer (5) comprises an additional hygroscopic material (14; 14').

16. An insulation system as claimed in claim 15, in which the thermally insulating layer (5) and the additional hygroscopic material (14; 14') constitute a flexible pipe shell, a pleated mat or a laminated mat.

17. An insulation system as claimed in claim 1, in which the hygroscopic material (3) forms a reinforcement of the vapour barrier (2).

18. An insulation system as claimed in claim 1, in which the vapour barrier (2) has moisture adaptive properties.

* * * * *